Figure 1:
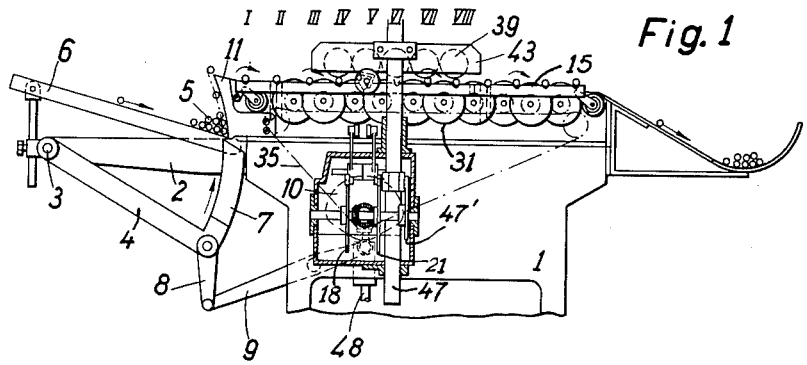

Dec. 4, 1962  J. DICHTER  3,066,506
AUTOMATIC MACHINE FOR WORKING THE ENDS OF LONG GLASS TUBES
Filed July 8, 1959  2 Sheets-Sheet 1

Inventor:
JAKOB DICHTER
BY Mead, Browne, Schuyler & Beveridge

Dec. 4, 1962   J. DICHTER   3,066,506
AUTOMATIC MACHINE FOR WORKING THE ENDS OF LONG GLASS TUBES
Filed July 8, 1959   2 Sheets-Sheet 2

Inventor:
JAKOB DICHTER
BY Mead, Browne, Schuyler & Beveridge 3,066,506
AUTOMATIC MACHINE FOR WORKING THE
ENDS OF LONG GLASS TUBES
Jakob Dichter, Sachsendamm 93,
Berlin-Schoneberg, Germany
Filed July 8, 1959, Ser. No. 825,702
Claims priority, application Germany July 11, 1958
3 Claims. (Cl. 65—243)

The present invention relates to a machine for reshaping one or both ends of long glass tubes. When ampule machines are provided with an automatic mechanism for vertically feeding glass tubes to the vertically disposed tube-supporting heads of the machine, in which said long glass tubes drop through an open-ended chuck until they strike upon an abutment, it is advantageous to have the ends of the glass tubes either melted flat or provided with a bottom.

The ends of the glass tubes delivered to the ampule machine are seldom smooth but have jagged edges. Aside from the fact that there is an empty working cycle when a glass tube without bottom is received, there are also considerable difficulties and interruptions resulting from the introduction of such faulty tubes.

It has been customary in the past to melt the ends of the tubes by a manual operation or to insert the tubes by hand, one at a time, into a vertically operated ampule machine and, after melting the bottoms, again withdraw them by hand.

It has also been proposed to horizontally rotate the tubes on rollers, heat the ends of the tubes and then strip them by applying a pair of pincers. This involves placing the long glass tubes on evenly distributed pairs of rollers, rotating and heating them and forming a bottom thereon by stripping a section of the tube. However, the tubes are mostly bent to begin with so that the ends of the tubes, upon being rotated, will hit against the rollers with the result that the bottoms being formed are slanted. In order to save material, the glass section to be stripped has to be as short as possible. The end of the tube in its vertical position has to be guided by hand against an abutment means.

It is an object of the invention to provide apparatus for automatically shaping both ends of long glass tubes which is operable to handle tubes of differing lengths and degrees of straightness.

The present invention provides an automatically operated machine in which the long glass tubes, without regard to the position of the ends, are stacked in a magazine from which they are lifted to a support and thereafter moved by a device, in the axial direction of the tube, until they strike against an abutment, whereupon a gripper means transfers the tubes in an exact position in relation to the heating burners through the successive stations of the machine in which the irregular ends of the tubes are provided, by severance of a section thereof, with a smooth melted edge or a bottom in a manner compatible with the body of the ampule or other tubular glass member being shaped. The devices for severing the end of the tube are known per se. To this end, the machine embodying the present invention may include a cutter and melting device or a melt sealing or bottom melting device.

In accordance with the invention, the glass tubes are supported on the lower pair of rollers, without regard to the location of the center of gravity, only for a short distance and as close as possible to the end of the tube end being reshaped, so that the bent tubes hitting against the rollers have little or no effect on the formation of the bottom.

The present invention also provides for the operation at one end of the tube to be followed by an operation at the opposite end of the tube which is carried out, without first considering the length of the tube, by moving the glass tube with the aid of a transporting device in the opposite direction until it strikes against an abutment.

Figure 2:
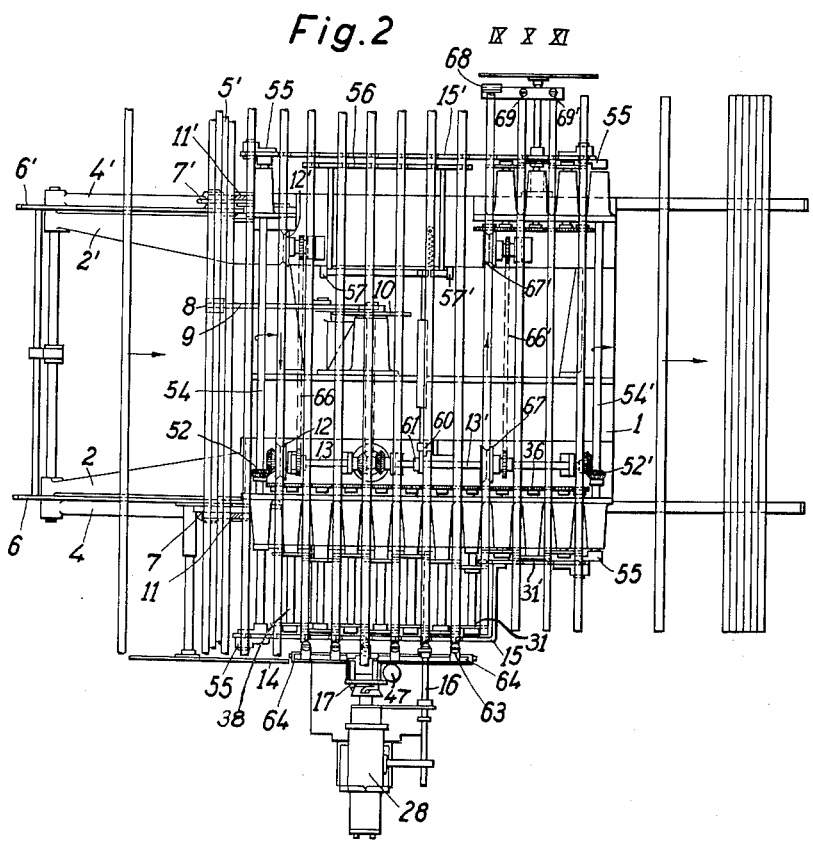
Figure 3:
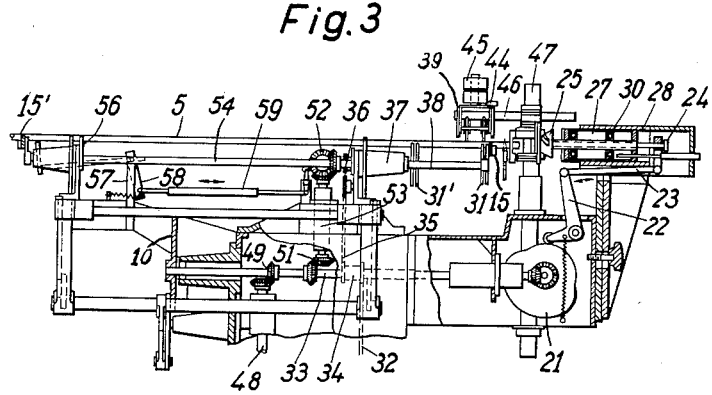
Figure 4:
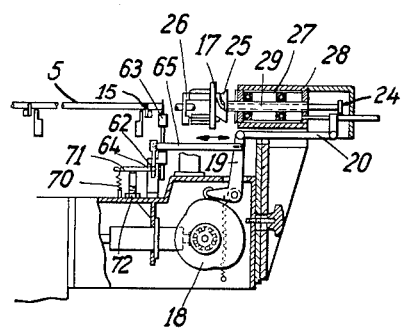
Figure 5:
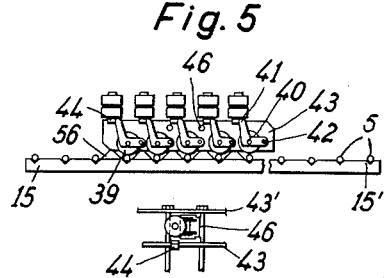

Further objects and features of the invention will be apparent from the following description of appended drawings, in which:

FIG. 1 shows a side elevational view partially in section of the machine;
FIG. 2 is a top view of the machine;
FIG. 3 shows a sectional view of the machine;
FIG. 4 shows a sectional view of the machine embodying the stripping pincers; and
FIG. 5 shows details of the upper roller arrangement.

The feeding mechanism for the glass tubes is supported on frame 1. A rod 3 rests on the two arms 2 and 2' and pivotally supports lifters 4 and 4'. The glass tubes 5 rest in a magazine, the bottom of which consists of two skirts 6 and 6' that are adjustable to a sloping position. The lifters 4 and 4' are provided at their distal ends with two curved elements 7 and 7' which are lifted jointly when lifters 4 and 4' are pivoted on rod 3 by means of levers 8 and 9 and cam 10 which is actuated by a conventional drive not shown in the drawing.

Curved elements 7 and 7' raise the glass tubes 5 along the curved vertical edges of receiving shelves 11 and 11' until the glass tube 5 is gravitationally transferred from the slanting ends of curved elements 7 and 7' onto the downwardly inclined upper edges of receiving shelves 11 and 11'. From shelves 11, 11', the tube is transferred, by structure to be described onto V-shaped rollers 12 and 12' which are driven by shaft 13 with the aid of chains. The direction of rotation of rollers 12 and 12' is chosen so that the glass tube 5 lying on the V-shaped openings of rollers 12 and 12' is displaced in the axial direction toward an abutment 14. Abutment 14 is mounted on frame 1 and is adjustable in the axial direction of the tube and forms the limit of movement of the tube end relative to the tube and shaping device.

Abutment 14 is extended laterally near the feeding mechanism to establish the position of the tube ends relative to the shaping devices. Bundles of glass tubes 5 may be placed on the feeding mechanism without observing the distance from abutment 14, whereupon they are moved by curved elements 7 and 7', by way of receiving shelves 11 and 11', into station I and from there, by means of transporting rails 15 and 15', to a succession of stations. Stations I–VIII, inclusive, represent successive positions of the glass tubes and correspond to the positions of successive notches in transporting rails 15, 15' when in the FIG. 1 position reading from left to right. Rollers 12 and 12' are located in station II and are rotated at a predetermined peripheral speed sufficient to drive the glass tube into engagement with abutment 14 and to slide relative to the tube after the tube engages the abutment.

Abutments 11 and 11' are adjustable in the working direction of the machine relative to curved elements 7 and 7' so that only one glass tube can lie on the projecting upper end of these elements. Glass tubes 5 are lifted from the stack, and the tubes that may pile up one upon another fall back on the stack since the receiving shelves 11 and 11', due to the curvature of elements 7 and 7', pushes them away.

The glass tubes are transported from station to station by means of rails 15 and 15' provided with suitable recesses. The rails driven from a continuously adjustable drive (not shown) through shaft 48, gear 49 and main shaft 33 by means of which vertical shaft 53 and horizontal shafts 54 and 54' are rotated at the same peripheral speed by means of gears 51, 52 and 52', respectively. Rails 15 and 15' are pivotally mounted by means of pins on cranks 55 which are secured to the ends of shafts 54 and 54'.

During the rotation of the glass tubes 5 in each of the stations, the ends of the tubes are free to move around. In order to permit undisturbed grasping of the tubes, as they are transported by means of the recesses in rail 15', the latter, as shown in FIG. 5, may be provided with recesses that are V-shaped to facilitate the grasping of the freely moving ends 5' of tubes 5. Alternatively, there may be provided a separate pivotal support, as shown in FIGS. 2 and 3.

The rotation of the glass tubes is produced by rollers 31 and 31' which are driven by a continuously adjustable drive through a chain 32, the double sprocket wheel 34 which loosely revolves on shaft 33, chain 35, sprockets 36 and the shafts 38 in supports 37.

The glass tubes 5 lie on the rollers, the rollers 31 being located as close as possible to the bottom melting zone. The rollers 31' are not positioned at the location of the center of gravity of the glass tube but rather as close as possible to rollers 31. It is known that glass tubes having small diameters are more likely to be severely bent. If such tubes were simply to lie evenly spaced on the lower pair of rollers, the ends thereof would strike against the rollers during the bottom shaping step with the result that the bottoms being formed are slanted. The invention therefore provides for supporting the glass tube, without regard to the location of the center of gravity, as close as possible to the bottom shaping end thereof, whereby the tube end is held in position by the downward pressure of the rollers so that the other tube end 5' is free to move around.

Downwardly pressing rollers 39 are rotatably supported on shafts 40 which are fastened to lever 41. Levers 41 are mounted on plates 43 and 43' which are separated by spacing bolts, and are independently pivoted on bolts 42. Levers 41 are provided with extensions 44 which engage plates 43 to determine the lowermost position of rollers 39. Each lever 41 is loaded with weights 45. This is done for the purpose of carrying along the glass tubes during the rotation thereof depending upon the shifting of weight resulting from the one-sided loading of the pair of rollers by weight 45. This upper roller system is supported upon rod 47 by rod 46 attached to plate 43. Rod 47 is movable relative to frame 1 in a vertical direction and is driven in vertical movement by a cam 47'. When the roller system is lowered, the rollers independently from each other force the glass tubes in the various stations onto the supporting roller pairs.

The upper pressure-exerting rollers 39 are capable of being adjusted for the purpose of insuring rotation without lateral displacement.

The end of the tube is heated in stations III and IV. The heating, which is confined to the section to be acted upon for the formation of the bottom, is carried out to the extent necessary to prevent its collapsing during the transfer to station V and yet permit, after intensive heating by means of an oxygen burner, quick stripping in station V immediately upon being engaged by pincers located at station V.

When a glass tube 5 is deposited by transporting rails 15 and 15' in station V, a pincer assembly 17 is applied with its open jaws over the end of the tube. The pincer system is supported by a spindle 27 which is movable in the cylindrical support 28 by means of cam 18, through bell crank 19 and linkage rod 20 (FIG. 3).

The jaws 26 of the pincers are opened and closed by the movement of rod 24 which is supported in the pincer housing 29. The rod 24 is connected with conical head 25 and is moved in known manner by cam plate 21, bell crank 22 and linkage rod 23 (FIG. 4). The rotation of the pincer housing 29 by the unsoftened glass when the jaws 26 are closed is facilitated by ball bearings 30 located in spindle 27.

However, the pincers may have an independent continuously adjustable drive by means of which the pincers are rotated at an angular velocity greater or less than the rotation of the glass tube.

The tube bottom, which is still thin, is melted in station VI by means of a gas-, air- or oxygen-burner, to the required thickness and for the purpose of straightening it, whereupon the glass tube is transferred to the succeeding station.

In station VII, the bottom is maintained at the shaping temperature by means of a burner and is further straightened or reshaped by the application of a punch 16.

A burner in station VIII serves to retemper the finished bottom.

A receiving shelf 56, which is also provided with V-shaped recesses, is rockably supported upon rods 57 and 57'. It can be rocked through lever 58, adjustable rod 59 and lever 60 by means of cam 61, keyed to shaft 13', as soon as the glass tubes 5 are forced by the upper pressure-exerting rollers 39 against the lower rollers 31, 31', and is lifted against the tubes when the pressure rollers are raised.

In the event that the glass tubes are more than normally bent, they can be rotated only very slowly on the supports, otherwise they would be quickly broken by the centrifugal force or cause other undesirable effects. As a result of this, and when it becomes necessary to interrupt the rotation of the glass tubes as they are lifted for transportation from rollers 31 while, at the same time, the burners continue to heat the tubes that remain for some time in the region of such burners, the heat transferred to them is uneven and one-sided which results in slanting bottoms, and, consequently, faulty production. The invention accordingly provides for removing single burners, or all burners, away from the shaping zone as soon as the rotation of the tube is interrupted, and returning the burner or burners to their previous position when the rotation of the tube is resumed.

The burners 63 (FIG. 4) are secured to rod 62 and are adjustable in vertical and horizontal direction and are flexibly connected to the gas, air or oxygen supply conduits. The rod 62 is pivotal in support 64 and can be rocked through link 65 connected with bell crank 19, when the latter causes the end of the tube to be stripped by pincers 17. When the latter is withdrawn inwardly, spring 70 pulls rod 62 to its starting position, whereby pin 71 comes to rest against abutment 72.

The ends of the glass tubes 5 are seldom smooth but have jagged edges and are also uneven in respect to the position occupied by the ends at the side undergoing stripping. It would require a special expenditure of work if it were necessary, for the sake of economy of material, to supply the ends of the tubes to the stripping device all uniformly aligned and in a certain position.

According to the invention, the glass tubes irregularly stacked with respect to the position of their ends in a magazine are supplied from the magazine directly or after coming to rest at an intermediate point, to a working station in which one or more rollers or pushers engage the tube with their contacting surfaces and effect a movement therewith in the desired direction of thrust, the limit of movement being such that, if necessary, the tube is caused to slide upon said contacting surfaces when the end of the tube strikes against an abutment. The advance of the tube is carried out to the extent necessary to insure that even tubes lying with their ends farther away from the abutment can be positively carried toward it. The transporting means may consist of rollers with lateral boundaries or rollers provided with recesses, that are constantly driven, or the like means that are operated intermittently.

In FIG. 2, the bearing supported V-shaped rollers 12 and 12′ are driven by shaft 13 through chain 66 in clockwise direction as shown by the arrow, so that the glass tubes 5 lying thereon are advanced until they strike against abutment 14 and thereupon slide on the roller until the gripper rails 15 and 15′ lift the tube.

A corresponding arrangement is provided at the outlet side of the machine. In this case, the rollers 67 and 67′, which are driven by shaft 13′ through chain 66′, advance the tubes in opposite directions until they reach adjustable abutment 68 and thereupon slide against it until the gripper rails 15 and 15′ transfer the tubes to the succeeding stations X and XI containing melting burners 69 and 69′ and from there to a storage place. The melting of the ends is carried out for the purpose of preventing the formation of splinters in the immediately following vertical sequence of operations, which would fall into the tube.

It will be appreciated that all moving parts of the mechanism are driven from drive shaft 48 and the various cams, gears, etc. are chosen to achieve the desired synchronization between the respective portions of the mechanism.

While exemplary embodiments of the invention have been described, it will be apparent to those skilled in the art that the disclosed embodiments may be modified. Therefore, the foregoing description is to be considered exemplary rather than limiting and the true scope of the invention is that defined in the following claims.

I claim:

1. In a machine for processing the ends of elongate glass tubes, said machine having a tube receiving end and a tube discharge end, transporting means for transporting tubes in a direction normal to their length from said receiving end to said discharge end in intermittent step by step movement, tube supporting means defining a series of uniformly spaced stations along said transporting means for supporting said tubes between successive steps of movement by said transporting means, and a plurality of tube end shaping devices operatively located adjacent said supporting means at the respective stations; the improvement wherein a first series of said tube end shaping devices are disposed in longitudinal alignment along a first side of said machine at a first series of successive stations, a magazine adjacent said receiving end of said machine for supporting a supply of elongate glass tubes of random length, means operable in synchronism with said transporting means for transferring a tube from said magazine to the station of said supporting means adjacent said receiving end, means for longitudinally advancing a tube supported at the last mentioned station toward that side of said machine along which said first series of tube end shaping devices are disposed, and an abutment at that side of said machine along which said first series of tube end shaping devices are disposed engageable with one end of a tube advanced toward said abutment by the last mentioned means to locate said one end of said tube in operative alignment with said first series of tube shaping devices.

2. In a machine as defined in claim 1, the improvement wherein said magazine comprises a pair of platelike skirt members spaced from each other by a distance less than the minimum length of a glass tube, each skirt member having a rack section inclined downwardly toward the receiving end of said machine, a transfer section inclined upwardly from the lower end of said rack section, and a shelf section inclined downwardly from the upper end of said rack section to said transfer means, a striplike member supported for movement upwardly along each transfer section and projecting from said transfer section toward said rack section by a distance substantially equal to the thickness of one of said tubes, and means for driving said striplike member upwardly along said transfer sections in synchronism with movements of said transfer means to elevate a tube from said rack section to said shelf section upon each step movement of said transfer means.

3. In an apparatus as defined in claim 1, the further improvement comprising a second series of said tube end shaping devices operatively located in longitudinal alignment along the side of said machine opposite said first side at a second series of successive work stations disposed between said first series of work stations and the discharge end of said machine, an intermediate work station located between the final work station of said first series and the first work station of said second series, means at said intermediate station for longitudinally advancing a tube located at said station toward the side of said machine along which said second series of work stations are disposed, and a second abutment located at said intermediate work station at the side of said machine along which said second series of tube end shaping devices are disposed engageable with a tube advanced by the last mentioned tube advancing means to locate the end of the tube opposite said one end in operative alignment with said second series of tube shaping devices.

References Cited in the file of this patent

UNITED STATES PATENTS

| | | |
|---|---|---|
| 1,437,239 | Halversen | Nov. 28, 1922 |
| 2,077,827 | Dichter | Apr. 20, 1937 |
| 2,103,585 | Kimble et al. | Dec. 28, 1937 |
| 2,228,010 | Koenig | Jan. 7, 1941 |
| 2,234,302 | Dichter | Mar. 11, 1941 |
| 2,470,923 | Eisler | May 24, 1949 |
| 2,494,674 | Smith | Jan. 17, 1950 |
| 2,878,619 | Van Steyn | Mar. 24, 1959 |